United States Patent
Xiao et al.

(10) Patent No.: US 8,336,083 B2
(45) Date of Patent: Dec. 18, 2012

(54) TRUSTED NETWORK ACCESS CONTROL SYSTEM BASED TERNARY EQUAL IDENTIFICATION

(75) Inventors: Yuelei Xiao, Shaanxi (CN); Jun Cao, Shaanxi (CN); Xiaolong Lai, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 222 days.

(21) Appl. No.: 12/743,170

(22) PCT Filed: Nov. 14, 2008

(86) PCT No.: PCT/CN2008/073069
§ 371 (c)(1),
(2), (4) Date: May 14, 2010

(87) PCT Pub. No.: WO2009/065350
PCT Pub. Date: May 28, 2009

(65) Prior Publication Data
US 2010/0251334 A1 Sep. 30, 2010

(30) Foreign Application Priority Data
Nov. 16, 2007 (CN) .......................... 2007 1 0019094

(51) Int. Cl.
*G06F 21/00* (2006.01)
(52) U.S. Cl. ....................................................... 726/3
(58) Field of Classification Search ....... 726/3; 713/164
See application file for complete search history.

(56) References Cited

U.S. PATENT DOCUMENTS

| 7,827,593 B2 * | 11/2010 | Smith et al. ...................... 726/3 |
| 2003/0028763 A1 | 2/2003 | Malinen et al. |
| 2005/0138417 A1 | 6/2005 | McNerney et al. |
| 2006/0221828 A1 | 10/2006 | Towle |
| 2006/0256763 A1 | 11/2006 | Nguyen et al. |
| 2007/0016939 A1 | 1/2007 | Leibovitz et al. |
| 2008/0189760 A1 * | 8/2008 | Rosenberg et al. ............... 726/1 |

FOREIGN PATENT DOCUMENTS

CN 1976338 A 6/2007
(Continued)

OTHER PUBLICATIONS

Russian Decision on Grant of a Patent for Invention regarding Application No. 2010123904/08(034116), dated Sep. 8, 2011. Translation provided by Unitalen Attorneys At Law.
(Continued)

*Primary Examiner* — Jeffrey Pwu
*Assistant Examiner* — Anthony Brown
(74) *Attorney, Agent, or Firm* — Harness, Dickey & Pierce, P.L.C.

(57) ABSTRACT

A trusted network access control system based on ternary equal identification is provided. The system includes access requestor AR, access controller AC and policy manager PM as well as the protocol interface among them. The protocol interface between the AR and AC includes a trusted network transmission interface (IF-TNT) and IF-TNACCS interface between TNAC client and TNAC server. The protocol interface between the AC and PM includes an identification policy service interface IF-APS, evaluation policy service interface IF-EPS and a trust measurement interface IF-TM. The protocol interface between the AR and PM includes a trust measurement interface IF-TM.

4 Claims, 2 Drawing Sheets

FOREIGN PATENT DOCUMENTS

| | | |
|---|---|---|
| CN | 1997026 A | 7/2007 |
| CN | 101242267 A | 8/2007 |
| CN | 101136928 A | 3/2008 |
| CN | 101159640 A | 4/2008 |
| CN | 101159660 A | 4/2008 |
| CN | 101242266 A | 8/2008 |
| CN | 101242268 A | 8/2008 |
| CN | 101242401 A | 8/2008 |
| EP | 2180632 A1 | 4/2010 |
| EP | 2184886 A1 | 5/2010 |
| RU | 2297037 C2 | 4/2007 |
| RU | 2300845 C2 | 6/2007 |
| WO | WO-2006048043 A1 | 5/2006 |
| WO | WO-2006115522 A1 | 11/2006 |
| WO | WO-2009071699 A2 | 6/2009 |

OTHER PUBLICATIONS

TCG: "TCG Trusted Network Connect TNC Architecture for Interoperability", Specification Version 1.2 Revision 4, May 21, 2007 Published, pp. 11-24.

He, Xinquan "New Network Connect Technology", Netinfo security, Mar. 2007, No. 3, pp. 71-73 (with translation of summary).

Zhang, Tao "Application of Trusted Network Connect (TNC) Architecture", Computer knowledge and Technology, 2005, No. 32 (2005), pp. 24-25 (with English abstract).

Extended European Search Report regarding Application No. 08853076.1-2413, dated Nov. 22, 2011.

TCG Trusted Network Connect TNC Architecture for Interoperability. Specification Version 1.1. Revision 2. May 1, 2006.

TPM Main, Part 1 Design Principles, Specification Version 1.2, Level 2 Revision 103, Jul. 9, 2007, TCG Published, 2007.

"Trusted network connected architecture research report." Key Laboratory of Computer Networks and Information Security Ministry of Education of XiDian University. Mar. 2007.

Xiaofei Zhang et al. "Trust Extended Dynamic Security Model and Its Application in Network." Lecture Notes in Computer Science. Volume 4325. pp. 404-415. 2006.

Shane Balfe et al. "Trusted Computing: Providing Security for Peer-to-Peer Networks." Information Security Group, Royal Holloway, University of London. Proceedings of the Fifth IEEE International Conference on Peer to Peer Computing (P2P '05). pp. 117-124. Aug. 31-Sep. 2, 2005.

"What is TCG's Trusted Network Connect?" Network Access Control Interoperability Lab. May 2006.

Xiao-Yong Li et al. "An Efficient Attestation for Trustworthiness of Computing Platform." Proceedings of the 2006 International Conference on Intelligent Information Hiding and Multimedia Signal Processing. pp. 625-630. Dec. 2006.

Trent Jaeger et al. "PRIMA: Policy-Reduced Integrity Measurement Architecture." SACMAT '06. Jun. 7-9, 2006.

Sachiko Yoshihama. "Platform Trust Based Access Control Framework." The 2006 Symposium on Cryptography and Information Security. Hiroshima, Japan. Jan. 17-20, 2006. The Institute of Electronics, Information and Communication Engineers.

Japanese Office Action regarding Application No. 2010-533421, dated Aug. 21, 2012. Summary provided by Unitalen Attorneys at Law.

* cited by examiner

TRUSTED NETWORK ACCESS CONTROL SYSTEM BASED TERNARY EQUAL IDENTIFICATION

CROSS-REFERENCE TO RELATED APPLICATIONS

This application is a 371 U.S. National Stage of International Application No. PCT/CN2008/073069, filed Nov. 14, 2008.

The present application claims the benefit of Chinese Patent Application No. 200710019094.7 filed with the Chinese Intellectual Property Office on Nov. 16, 2007, entitled "A Trusted Network Access Control System based on Tri-element peer authentication", which is incorporated herein by reference in its entirety.

FIELD OF INVENTION

The present invention relates to a field of network security technology, in particular to a trusted network access control system based on tri-element peer authentication.

BACKGROUND OF THE INVENTION

Along with the development of information, the problems of such malicious software as virus and worms are quite prominent. At present, there are more than 35,000 kinds of malicious software, and more than 40 million computers are infected every year. In order to protect computers from such attacks, not only a safety of transmission and a checkup of data input are required to be addressed, but also defense needs to be started from a source, that is, each terminal connected to the network. However, the conventional security defense technology has no defended against a wide variety of malicious attacks.

To address this issue, the international Trusted Computing Group (TCG) specially formulated a network connect standard based on trusted computing technology—Trusted Network Connect (TNC), which is referred to as TCG-TNC. The TCG-TNC includes an open terminal integrity architecture and a set of standards to ensure a secure mutual operation. This set of standards may protect a network in case of a user's need, and the user may define the extent of protection. The TCG-TNC is substantively starting to establish a connection based on the integrity of the terminal. Firstly, a set of policies on operation status in the trusted network interior system need to be created. Only terminals complying with the policies created by the network can access the network. The network isolates and locates those devices that do not comply with the policies. Due to the use of a trusted platform module TPM, an attack of the root kits may be blocked. The root kits are a kind of attack script, amended system program, or a set of attack script and tools, which is used for illegally obtaining the highest control authorization of the system in a target system.

FIG. 1 illustrates the existing TCG-TNC architecture having three logical entities, i.e., an access requestor AR, a policy enforcement point PEP and a policy decision point PDP, which may be distributed at any position in the network. The TCG-TNC architecture may be divided into three layers in a longitudinal direction, i.e., into a network access layer, an integrity evaluation layer and an integrity measurement layer. The network access layer has three components, i.e., a network access requestor NAR, a policy enforcer PE and a network access authorizer NAA, and a network authorization transport protocol interface IF-T and a policy enforcement point interface IF-PEP. The network access layer is adapted to support the conventional network connection technology, and the integrity evaluation layer is adapted to evaluate the integrity of all the entities which request to access the network. The integrity evaluation layer has two important interfaces: an integrity measurement collector interface IF-IMC and an integrity measurement verifier interface IF-IMV. Furthermore, there further has a TNC Client-Server interface IF-TNCCS between the TNC client and the TNC server. The integrity measurement layer has two components, i.e., an integrity measurement collector IMC and an integrity measurement verifier IMV, which are adapted to collect and verify information related to integrity of the access requestor. A complete information transmission process by a trusted network connection in the existing TCG-TNC architecture is as follows: before establishing a network connection, the TNC client TNCC needs to prepare the required platform integrity measurement information to submit the information to the integrity measurement collector IMC. In a terminal having a trusted platform module, the above step is for hashing the platform information required by the network policy to store the hashed information into each platform configuration register, pre-customing, by the TNC server TNCS, a verifying requirement of the platform integrity to provide to the integrity measurement verifier IMV. The specific processes of performing a network access control with the existing TCG-TNC architecture are as follows:

1) initiating an access request by the network access requestor NAR to the policy enforcer PE;
2) transmitting the access request description by the policy enforcer PE to the network access authorizer NAA;
3) after receiving the access request description of the network access requestor NAR, the network access authorizer NAA executes a user authentication protocol with the network access requestor NAR, and transmitting, by the network access authorizer NAA, the access request and information for indicating a successful user authentication to the TNC server TNCS in case of a successful user authentication;
4) after receiving the access request and the information for indicating a successful user authentication transmitted by the network access authorizer NAA, the TNC server TNCS starts to execute a bidirectional platform credential authentication with the TNC client TNCC, for example, an attestation identity key AIK for verifying a platform;
5) when the platform credential authentication is successful, the TNC client TNCC informs the integrity measurement collector IMC that a new network connection has been started and an integrity handshake protocol is required. The integrity measurement collector IMC returns the required platform integrity information through the integrity measurement collector interface IF-IMC. The TNC server TNCS submits the platform integrity information to the integrity verifier IMV through the integrity measurement verifier interface IF-IMV;
6) in the integrity handshake protocol process, the TNC client TNCC and the TNC server TNCS needs to switch data once or for many times, until the TNC server TNCS satisfies;
7) after completing the integrity handshake protocol for the TNC client TNCC, the TNC server TNCS will transmit a recommendation information to the network access authorizer NAA for asking for a permission of access; and the policy enforcement point PEP may still not permit an access of the access requestor AR if there exist other considerations on security; and 8) the network access authorizer NAA transfers an access decision to the policy enforcer PE that finally executes the decision to control the access of the access requestor AR.

Recently, the TCG-TNC architecture product is not mature enough, and some important technologies of the TCG-TNC architecture are still in the phases of research and standardization. Since there exists a predefined security channel between the policy enforcement point PEP and the policy decision point PDP which may manage a large amount of policy enforcement points PEPs, the policy decision point PDP must configure a large amount of security channels, so that management become complex. Therefore, the expansibility of the exiting TCG-TNC architecture is poor. Furthermore, because the safeguard protection for the data above the network access layer will be performed, a security passage between the access requestor AR and the policy decision point PDP, that is, a session key negotiation between them needs to be established; however, a data protection between the access requestor AR and the policy enforcement point PEP is also necessary, and thus a session key negotiation between the access requestor AR and the policy decision point PEP will be performed again, which make the key negotiation process complex. Meanwhile, the master key negotiated by the access requestor AR and the policy decision point PDP is transferred to the policy enforcement point PEP by the policy decision point PDP, and the transmission of a key on the network introduces new security attack points, thereby reducing the security. Furthermore, the same master key is used for the two session key negotiations, and thus the security of the whole trusted network connection architecture is reduced. Moreover, the access requestor may not verify the validity of the AIK certificate of the policy decision point PDP. In the platform credential authentication process, the access requestor AR and the policy decision point PDP use an AIK private key and certificate to perform a bidirectional platform credential authentication, and both sides need to verify the validity of the AIK certificate. If the policy decision point PDP is an Internet service provider of the access requestor AR, the access requestor AR has not access to the network until connecting to the trusted network, that is, cannot verify the validity of the AIK certificate of the policy decision point PDP, which is insecure. At last, the platform integrity evaluation is not peer-to-peer. In the TCG-TNC architecture, the policy decision point PDP performs the platform integrity evaluation to the access requestor AR, but the access requestor AR does not perform the platform integrity evaluation to the policy decision point PDP, which is unfair and insecure for the access requestor AR. Furthermore, the policy enforcement point PEP may know whether the platform of the access requestor AR is trusted based on the executing policy of the point decision point PDP, but the access requestor AR cannot determine whether the platform of the policy decision point PDP is trusted, such that the access requestor AR may be connected to an untrustworthy device (for example, an device existing malicious software etc), and thus it is insecure. Moreover, the trust chain from the access requestor AR to the trusted network may be interrupted at the policy enforcement point PEP, but peer trust is necessary in the Ad hoc network.

SUMMARY OF THE INVENTION

The object of the invention is to provide a trusted network access control system based on tri-element peer authentication, which solves the technical problem of the poor expansibility of the existing TCG-TNC described in the Background Information, which may further solve the technical problems that the process of key negotiation is complex, the security is relatively low, the access requestor may not be able to verify the validity of the AIK certificate and the platform integrity evaluation may be not peer-to-peer.

The technical solution of the invention is as follows:

A trusted network access control system based on tri-element peer authentication, comprising an access requestor AR, an access controller AC and a policy manager PM, wherein
the AR is connected with the AC through a protocol interface via network, the AC is connected with the PM through a protocol interface via network and the AR is connected with the PM through the AC via network;
the protocol interface connecting the AR with the AC comprises: a trusted network transport interface IF-TNT and an interface IF-TNACCS between the TNAC client and the TNAC server, wherein the IF-TNT is the information exchanging interface between the network access requestor NAR and the network access controller NAC on the network access control layer; and the IF-TNACCS is an information exchanging interface between the TNAC client and the TNAC server on the trusted platform evaluation layer;
the protocol interface between the AC and the PM comprises: an authentication policy service interface IF-APS, an evaluation policy service interface IF-EPS and a trustworthiness measurement interface IF-TM, wherein the IF-APS is an information exchanging interface between the network access controller NAC and the authentication policy server APS on the network access control layer; the IF-EPS is an information exchanging interface between a TNC server and an evaluation policy server EPS on the trusted platform evaluation layer; and the IF-TM is an interface between the trustworthiness measurement collector and the trustworthiness measurement verifier on the trustworthiness measurement layer;
the protocol interface connecting the AR with the PM comprising a trustworthiness measurement interface IF-TM, wherein the IF-TM is an interface between the trustworthiness measurement collector and the trustworthiness measurement verifier on the trustworthiness measurement layer.

Optionally, the AR comprises a network access requestor NAR, a TNAC client TNACC and a trustworthiness measurement collector $TMC_1$ of the access requestor, the NAR is connected with the TNACC in a data carrying manner; and The TNACC is connected with the trustworthiness measurement collector $TMC_1$ of the AR through the trustworthiness measurement collector interface IF-TMC;
the AC comprises the NAC, the TNAC server TNACS and the trustworthiness measurement collector $TMC_2$ of the AC, the NAC is connected with the TNACS in a data carrying manner, and the TNACS is connected with the $TMC_2$ of the AC through the IF-TMC;
the PM comprises the APS, the EPS and the trustworthiness measurement verifier TMV, the APS is connected with the EPS in a data carrying manner, and the EPS is connected with the TMV through the trustworthiness measurement verifier interface IF-TMV;
the NAR is connected with the NAC through the trusted network transport interface IF-TNT, and the NAC is connected with the APS through the IF-APS;
the TNACC is connected with the TNACS through the interface IF-TNACCS between the TNAC client and the TNAC server, and the TNACS is connected with the EPS through the IF-EPS;

the TMC$_1$ of the AR is connected with the TMV through the IF-TM, and the TMC$_2$ of the AC is connected to the TMV through the IF-TM.

Optionally, the AR and the AC are logical entities having a trusted platform module TPM.

Optionally, the TMC$_1$ of the AR is a component for collecting the platform trustworthiness information of the AR, the TMC$_2$ of the AC is the component for collecting the platform trustworthiness information of the AC, and the TMV is a component for performing the platform trustworthiness verifying to the AR and the AC.

Compared with the existing technologies, the invention has the following advantages:

The invention defines trustworthiness is each platform status attribute which is used to measure and evaluate whether a platform is trustworthy, for example, the integrity, and thus expanses the description of trustworthiness of the platform. In the invention, the key negotiation between the access requestor and the access controller is performed, and data in the trusted platform evaluation process and the service data undergoing the trusted network access control TNAC are protected for safety directly without a second session key negotiation. Therefore, the key negotiation process may be simplified and the security of the trusted network access control TNAC may be improved. Moreover, the master key generated in authentication process of the invention is not required to be transferred in the network, such that the security of the key may be ensured. Secondly, the invention may improve the security of the trusted platform evaluation process, simplify the key management of the trusted network access control TNAC and the trustworthiness measurement verifying mechanism. A tri-element peer authentication method, that is, a bidirectional authentication method based on a third party, is used on the trusted platform evaluation layer to respectively implement identification and verification of the AIK certificates and the platform trustworthiness of the access requestor and the access control concentratively, such that not only the security of the trusted platform evaluation process is increased, but also the key management of the trusted network control TNAC architecture and the trustworthiness verifying mechanism are simplified. Furthermore, the invention not only uses a tri-element peer authentication on the network access control layer to implement the bidirectional user authentication, but also uses the method on the trusted platform evaluation layer to implement the bidirectional trusted platform evaluation. Therefore, the invention improves the security of the whole trusted network access control TNAC architecture. In practical application, one policy manager needs to manage a large amount of access controllers. The invention may eliminate a requirement of strong security relevancy between the access controller and the policy manager. Therefore, the invention further increases the expansibility of the trusted network access control TNAC. In the invention, since the bidirectional trusted platform evaluation between the access requestor and the access controller is implemented, the problem that the trust chain is interrupted during accessing the access controller of the device is eliminated. At last, in the invention, the access controller performs multi-level control to the controlled ports by using a multi-level port control, thereby controlling strictly the access right of the access requestor, improving the security and performance of the trusted network access control architecture and expanding the description of the trusted platform module. In the existing TCG-TNC architecture, the trusted platform module TPM is the secure chip on the main board, and in the invention, the trusted platform module TPM may be an abstract software module which is responsible for implementing a trusted platform evaluation. For example, the trusted platform module TPM implemented by software scans each component of the platform, and then generates secure scanning results to send it to the counterpart platform, and the counterpart platform evaluates those secure scanning results, such that the trusted platform evaluation is implemented.

Figure 1:
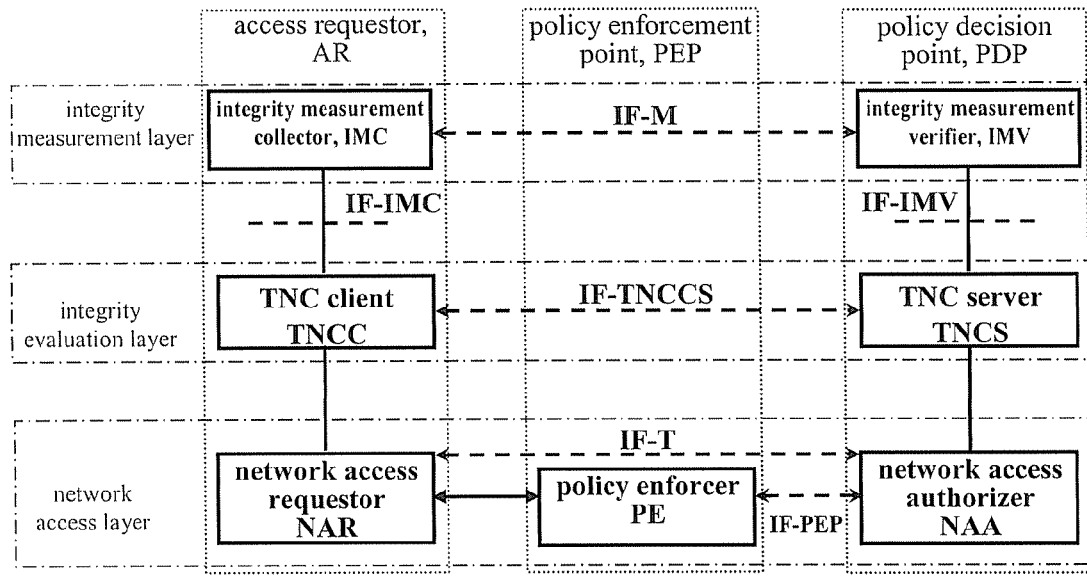
FIG. 1 is a schematic view of the existing TCG-TNC basic architecture.

The reference signs of the Drawing are explained as follows:

PEP: policy enforcement point; PE: policy enforcer; PDP: policy decision point; NAA: network access authorizer; AR: access requestor; AC: access controller; PM: policy manager; TMC$_1$: the trustworthiness measurement collector of the access requestor AR; TMC$_2$: the trustworthiness measurement collector of the access controller AC; TMV: trustworthiness measurement verifier; TNACC: TNAC client; TNACS: TNAC server; EPS: evaluation policy server; NAR: network access requestor; NAC: network access controller; APS: authentication policy server; IF-TNT: trusted network transport interface defining an information exchanging interface between the network access requestor NAR and the network access controller NAC; IF-APS: authentication policy service interface defining an information exchanging interface between the network access controller NAC and the authentication policy server APS; IF-TNACCS: TNAC client-TNAC server interface which is the protocol interface between the TNAC client TNACC and the TNAC server TNACS; IF-EPS: evaluation policy service interface defining an information exchanging interface between the TNAC server TNACS and the evaluation policy server EPS; IF-TMC: trustworthiness measurement collector interface which is a protocol interface between the TNAC client TNACC and the trustworthiness measurement collector TMC$_1$ of the access requestor AR, which is also a protocol interface between the TNAC server TNACS and the trustworthiness measurement collector TMC$_2$ of the access controller AC; IF-TMV: trustworthiness measurement verifier interface which is a protocol interface between the evaluation policy server EPS and the trustworthiness measurement verifier TMV; IF-TM: trustworthiness measurement interface which is a protocol interface between the trustworthiness measurement collector TMC$_1$ of the access requestor AR and the trustworthiness measurement verifier TMV, which is also a protocol interface between the trustworthiness measurement collector TMC$_2$ of the access controller AC and the trustworthiness measurement verifier TMV.

DESCRIPTION OF THE PREFERRED EMBODIMENTS

The invention is a network connection control system based on a trusted computing technology, and is a trusted network access control TNAC system based on tri-element peer authentication. The invention is provided mainly for the existing problem of the TNC architecture in the current TCG system.

The trustworthiness in the invention means each platform status attribute which is used to measure and evaluate whether a platform is trustworthy, for example, the integrity.

In the invention, the trusted platform module TPM may be a trusted platform module TPM of the TNC architecture in the TCG system, or an abstract software module responsible for implementing a trusted platform evaluation. For example, the trusted platform module TPM implemented by software scans each component of the platform, and then generates a secure scanning result to send the result to a counterpart platform. The counterpart platform evaluates those secure scanning results, thereby implementing a trusted platform evaluation.

Figure 2:
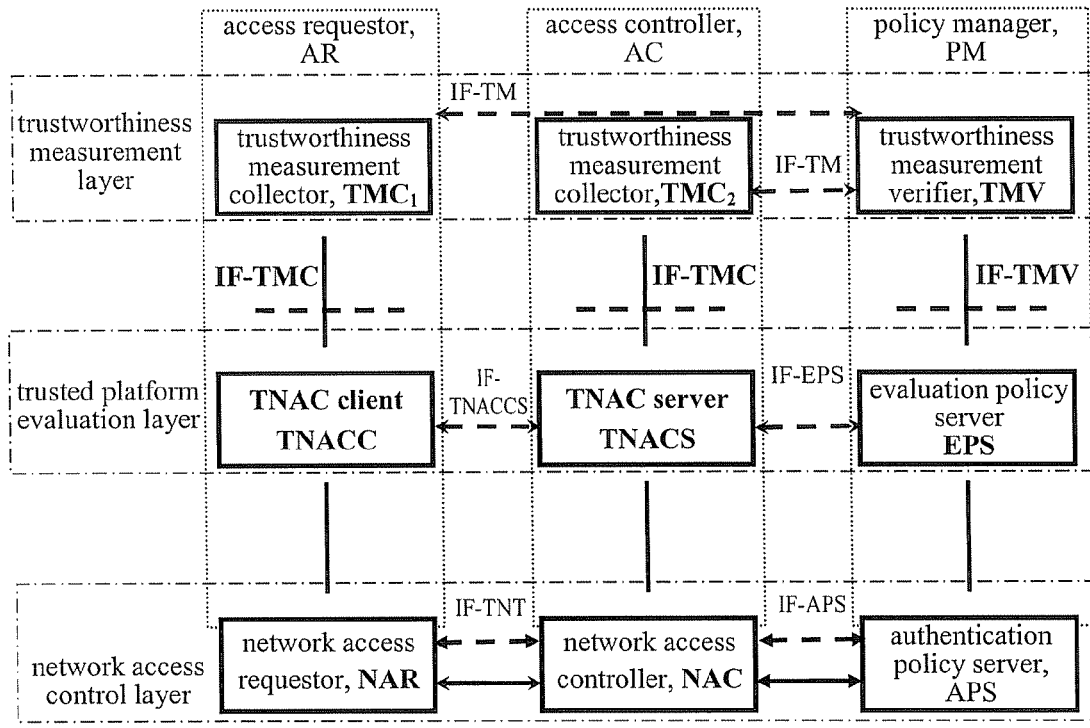
FIG. 2 is a schematic view of the TNAC basic architecture according to the invention.

Referring to FIG. 2, the invention mainly consists of three logical entities, i.e., an access requestor AR, an access controller AC and a policy manager PM, which may be distributed at any position in the network. The access requestor AR is also referred to a requestor, a user station and so on; the access controller AC is also referred to an authentication access controller, a base station, an access service unit and so on; the policy manager PM is also referred to an authentication server, a trusted server, a backstage server and so on. The access requestor AR is connected with the access controller AC through a protocol interface via network, the access controller AC is connected with the policy manager PM through a protocol interface via network, and the policy manager PM is connected with the access requestor AR through the access controller AC via network. The access requestor AR requests to access to a protection network and can judge whether the protection network needs to be accessed. The access controller AC controls the access of the access requestor AR to the protection network. The policy manager PM manages the access requestor AR and the access controller AC, and formulates and distributes network access control policy for the access requestor AR and the access controller AC. On a network access control layer, the access requestor AR, the access controller AC and the policy manager PM execute a tri-element peer authentication protocol, that is, a bidirectional user authentication protocol based on a trusted third party policy manager PM, to implement the bidirectional user authentication between the access requestor AR and the access controller AC. On the trusted platform evaluation layer, the access requestor AR, the access controller AC and the policy manager PM execute a tri-element peer authentication protocol, that is, a bidirectional trusted platform evaluation protocol based on a trusted third party policy manager PM, to implement the bidirectional trusted platform evaluation between the access requestor AR and the access controller AC. The policy manager PM is adapted to verify the validity of the AIK certificates of the access requestor AR and the access controller AC and checks the platform trustworthiness of the access requestor AR and the access controller AC. During verifying the platform trustworthiness of the access requestor AR and the access controller AC, a trustworthiness measurement collector and a trustworthiness measurement verifier on the trustworthiness measurement layer will be used. The access requestor AR mainly consists of a network access requestor NAR, a TNAC client TNACC and a trustworthiness measurement collector $TMC_1$ of the access requestor. The network access requestor NAR is connected with the TNAC client TNACC in a data carrying manner to forward messages by the TNAC client TNACC. The TNAC client TNACC is connected to the trustworthiness measurement collector $TMC_1$ of the access requestor AR through a trustworthiness measurement collector interface IF-TMC to implement the communication between the trustworthiness measurement collector $TMC_1$ of the access requestor AR and the trustworthiness measurement verifier TMV.

The access controller AC mainly consists of a network access controller NAC, a TNAC server TNACS, a trustworthiness measurement collector $TMC_2$ of the access controller AC. The network access controller NAC is connected with the TNAC server TNACS in a data carrying manner to forward messages by the TNAC server TNACS. The TNAC server TNACS is connected with the trustworthiness measurement collector $TMC_2$ of the access collector AC through a trustworthiness measurement collector interface IF-TMC to implement a communication between the trustworthiness measurement collector $TMC_2$ of the access controller AC and the trustworthiness measurement verifier TMV. It shall be stated that the protocol interface connecting the AR with the AC includes a trusted network transport interface IF-TNT and an interface IF-TNACCS between the TNAC client and the TNAC server.

The policy manager PM mainly consists of an authentication policy server APS, an evaluation policy server EPS, a trustworthiness measurement verifier TMV. The authentication policy server APS is connected with the evaluation policy server EPS in a data carrying manner to forward messages by the evaluation policy server EPS. The evaluation policy server EPS is connected with the trustworthiness measurement verifier TMV through a trustworthiness measurement verifier interface IF-TMV to implement a communication between the trustworthiness measurement verifier TMV and the trustworthiness measurement collector $TMC_1$ of the access requestor AR and the trustworthiness measurement collector $TMC_2$ of the access controller AC.

The network access requestor NAR, the network access controller NAC and the authentication policy server APS constitute a network access control layer. The network access requestor NAR is connected with the network access controller NAC through a trusted network transport interface IF-TNT which is the information exchanging interface between the network access requestor NAR and the network access controller NAC on the network access control layer; and the network access controller NAC is connected with the authentication policy server APS through the authentication policy service interface IF-APS. On the network access control layer, the network access requestor NAR, the network access controller NAC and the authentication policy server APS execute a tri-element peer authentication protocol, that is, a bidirectional user authentication protocol based on a trusted third party authentication policy server APS. The network access control layer is responsible for implementing the following: a bidirectional user authentication and a key negotiation between the access requestor AR and the access controller AC, a multi-level control for the controlled port based on the user authentication result and the trusted platform evaluation result to implement an mutual access control between the access requestor AR and the access controller AC. The network access control layer may uses an access control method based on a tri-element peer authentication, in which a multi-level port control function is added on the basis of the network access control technology used in Chinese WLAN standard.

It shall be stated that the information exchanged between the network access requestor NAR and the network access controller NAC on the network access control layer includes control management information, the tri-element peer authentication protocol, the session key negotiation protocol and the network transfer protocol on the network access control layer, and so on. The control management information includes a negotiation and control command of the access policy, such as a negotiation and access suite, an authentication suite and a cipher suite, to send various kinds of control commands; and the network transfer protocol mainly includes the data package of the tri-element peer authentication protocol and the secret transmission of data on the upper layer.

The TNAC client TNACC, the TNAC server TNACS and the evaluation policy server EPS constitute the trusted platform evaluation layer. The TNAC client TNACC is connected with the TNAC server TNACS through the TNAC client-TNAC server interface IF-TNACCS which is the information exchanging interface between the TNAC client and the TNAC server on the trusted platform evaluation layer; and the TNAC server TNACS is connected with the evaluation policy server EPS through the evaluation policy service interface IF-EPS. The trusted platform evaluation layer is adapted to implement the trusted platform evaluation between the access requestor AR and the access controller AC, including the platform credential authentication and the platform trustworthiness measurement verification. The policy manager PM is adapted to verify the validity of the AIK certificates of the access requestor AR and the access controller AC, and check the platform trustworthiness of the access requestor AR and the access controller AC. On the trusted platform evaluation layer, the TNAC client TNACC, the TNAC server TNACS and the evaluation policy server EPS execute the tri-element peer authentication protocol, that is, the bidirectional trusted platform evaluation protocol based on a trusted third party evaluation policy server EPS.

It shall be stated that the information exchanged between the TNAC client and the TNAC server on the trusted platform evaluation layer includes session management information and the tri-element peer authentication protocol on the trusted platform evaluation layer; the session management information includes the negotiation trusted platform evaluation policy, for example: negotiating to extract the value of platform configuration register PCRs to prove the trustworthiness measurement per se to the counterpart platform, and negotiating the standard description language of the trustworthiness report and the control command information, and so on.

The trustworthiness measurement collector $TMC_1$ of the access requestor AR, the trustworthiness measurement collector $TMC_2$ of the access controller AC and the trustworthiness measurement verifier TMV constitute the trustworthiness measurement layer. The trustworthiness measurement collector $TMC_1$ of the access requestor AR is connected with the trustworthiness measurement verifier TMV through a trustworthiness measurement interface IF-TM, and the trustworthiness measurement collector $TMC_2$ of the access controller AC is connected with the trustworthiness measurement verifier TMV through a trustworthiness measurement interface IF-TM. The trustworthiness measurement layer is adapted to collect and verify information related to the platform trustworthiness measurement of the access requestor AR and the access controller AC.

It shall be stated that the information exchanged between the network access controller NAC and the authentication policy server APS on the network access control layer includes the tri-element peer authentication protocol and the network transfer protocol on the network access control layer. The information exchanged between the TNC server and the evaluation policy server EPS on the trusted platform evaluation layer includes tri-element peer authentication protocol and the trusted platform evaluation policy distribution protocol on the trusted platform evaluation layer. The IF-TM is an interface between the trustworthiness measurement collector and the trustworthiness measurement verifier on the trustworthiness measurement layer which is adapted to define the mutual operation protocol interface between the trustworthiness measurement collector and the trustworthiness measurement verifier produced by various manufacturers. The NAR is connected with the TNACC in a data carrying manner, which is adapted to forward messages by the TNAC client TNACC; and the TNACC is connected with the trustworthiness measurement collector $TMC_1$ of the AR through a trustworthiness measurement collector interface IF-TMC to implement the communication between the trustworthiness measurement collector TMC1 of the access requestor AR and the trustworthiness measurement verifier TMV.

Figure 3:
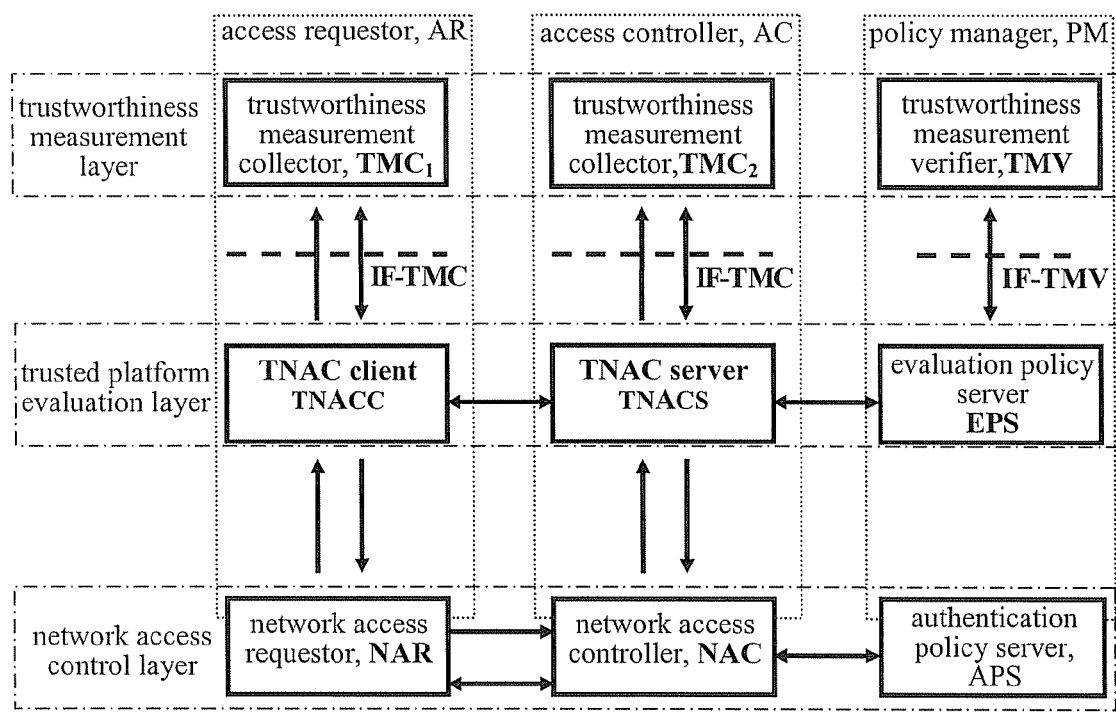
FIG. 3 is a schematic view of a complete information transfer of the trusted network access control TNAC according to the invention.

Referring to FIG. 3, the specific steps of implementing the trusted network access control TNAC based on the tri-element peer authentication according to the invention are listed as follows:

1) initializing the trustworthiness measurement collector TMC and the trustworthiness measurement verifier on the trustworthiness measurement layer, which may comprises the following sub-steps practically:

1.1) initializing the trustworthiness measurement collector TMC of the trustworthiness measurement layer by the TNAC client of the access requestor and the TNAC server of the access controller, and initializing the trustworthiness measurement verifier TMV of the trustworthiness measurement layer by the evaluation policy server of the policy manager.

1.2) storing, by the trusted platform modules TPMs of the access requestor AR and the access controller AC, the trustworthiness information required by the network policy into platform configuration registers PCRs, wherein the trustworthiness information needs to perform a hashing process to be stored into the platform configuration registers PCR when the trustworthiness information is integrity.

1.3) collecting the platform trustworthiness information of the access requestor AR by the TNAC client TNACC of the access requestor AR using the trustworthiness measurement collector $TMC_1$ of the access requestor, and collecting the platform trustworthiness information of the access controller AC by the TNAC client TNACC of the access controller AC using the trustworthiness measurement collector $TMC_2$ of the access controller.

1.4) formulating and distributing, by the policy manager PM, the network access control policy which includes the policy for determining whether the access requestor AR adds the network to be connected and the network access control policy of the access controller AC to the access requestor AR, and implementing, by the policy manager PM, the formulation and distribution of the network access control policy of the access requestor AR and the access controller AC based on the state information security grade protection standard.

1.5) preparing PCRs parameter table for requesting an inter-verification between the access requestor AR and the access control AC by the TNAC client TNACC and the TNAC server TNACS based on the network access control policy distributed by the policy manager, respectively.

2) executing a tri-element peer authentication protocol based on a third party that is the policy manager on the network access control layer, the access requestor, the access controller and the policy manager to implement the bidirectional user authentication between the access requestor and the access controller;

Specifically, the step comprising the following:

2.1) initiating an access request to the network access controller NAC by the network access requestor NAR.

2.2) after receiving the access request from the network access requestor NAR, starting the user authentication process by the network access controller NAC to execute the tri-element peer authentication protocol, i.e., the bidirectional authentication protocol based on the third party, between the network access requestor NAR and the network access controller NAC and the authentication policy server APS acting as the third party on the network access control layer, thereby implementing the bidirectional user authentication between the access requestor AR and the access controller AC and generating the user authentication results of the access requestor AR and the access controller AC. If the bidirectional user authentication is successful, the access requestor AR and the access controller AC will generate a master key there between them during the user authentication.

2.3) performing, by the access requestor AR and the access controller AC, a session key negotiation using the master key generated during the user authentication in case of a successful user authentication, and then sending the information for indicating successful user authentication from the network access requestor NAR and the network access controller NAC to the TNAC client TNACC and the TNAC server TNACS respectively, and controlling respectively the ports of the network access requestor NAR and the network access controller NAC based on the user authentication results of the access controller AC and the access requestor AR, such that the data in the trusted platform evaluation process can be passed through.

3) when the result of the bidirectional user authentication is successful or the local policy needs to execute the platform trustworthiness evaluation process, executing the tri-element peer authentication protocol based on a third party that is the policy manager by the access requestor, the access controller and the policy manager on the trusted platform evaluation layer to implement the bidirectional platform trustworthiness evaluation between the access requestor and the access controller.

When the TNAC server TNACS of the access controller AC receives the information for indicating the successful user authentication sent by the network access controller NAC, the TNAC client TNACC, the TNAC server TNACS and the evaluation policy server EPS of the trusted platform evaluation layer use the tri-element peer authentication protocol to implement the bidirectional trusted platform evaluation between the access requestor AR and the access controller AC. In the process of trustworthiness evaluation, the information interacted between the TNAC client and the TNAC server is transferred under the protection of the session key negotiated in the step 2.3). In the process of trustworthiness evaluation, information for identifying the platform configuration of the access requestor, for example, the measurement log corresponding to the value of the platform configuration register PCRs, and the repair information of the platform configuration and so on, needs to be transferred between the access requestor and the policy manager, which requires to be transferred secretly to avoid the access controller or an attacker to know the information. Similarly, the identifiable platform configuration information of the access controller also requires to be transferred secretly between the access controller and the policy manager to avoid the access requestor or an attacker to know the information. The usable secret transmission technique may be the symmetrical key encryption and the asymmetrical key encryption. In the process of the trusted platform evaluation, the evaluation policy server EPS acts as a third party, and the TNAC server TNACS, the TNAC client TNACC and the evaluation policy server EPS further need to perform information interaction with the trustworthiness measurement collector and the trustworthiness measurement verifier on the upper layer. The trusted platform evaluation may be implemented in the following manners:

performing a platform credential authentication: verifying the validity of the AIK certificates of the access requestor AR and the access controller AC by the policy manager PM.

checking a platform trustworthiness verification: verifying the platform trustworthiness of the access requestor AR and the access controller AC by the policy manager PM.

4) generating, by the TNAC client of the access requestor and the TNAC server of the access controller, a corresponding recommendation based on the platform trustworthiness evaluation results produced in the process of the platform trustworthiness evaluation to send them to the network access requestor and the network access controller respectively, such that the network access requestor and the network access controller perform ports control for access interactively according to the recommendation respectively.

In practice, the step may specifically comprise the following: the platform policy server generates the trusted platform evaluation results of the access requestor and the access controller in the process of the trusted platform evaluation to send the results to the TNAC client and the TNAC server. The TNAC client and the TNAC sever generate a corresponding recommendation based on the trusted platform evaluation results generated by the platform policy server to send the recommendation to the network access requestor and the network access controller respectively. The recommendation includes permission, prohibition, isolation repair and so on. The network access requestor and the network access controller control the ports based on the recommendation received by them respectively, thereby controlling the access between the access requestor and the access controller. If the recommendation received by the network access requestor and the network access controller is isolation, the network access requestor and the network access controller perform a repair based on the repair information of the platform configuration obtained by them in the platform trustworthiness evaluation process, and then re-perform the trusted platform evaluation.

The following implementing manners may be used for the above port control:

Both the access requestor and the access control define two kinds of logical ports: uncontrolled ports and controlled ports. The uncontrolled ports of the access requestor may pass through the user authentication and key negotiation protocol data, the trusted platform evaluation protocol data and the platform repair server data, and the controlled ports of the access requestor may only pass through the application server data. The uncontrolled ports of the access controller may only pass through the user authentication and key negotiation protocol data, and the controlled ports of the access controller implement the passage control of the trusted platform evaluation protocol data, the platform makeup repair service data and the application service data in a multi-level control manner. The access requestor and the access controller control the controlled ports based on the user authentication result and the trusted platform evaluation result.

What is claimed is:
1. A trusted network access control system based on tri-element peer authentication system, characterized in that the system comprises an access requestor AR, an access controller AC and a policy manager PM, wherein:

the PM is configured to verify validity of attestation identity key AIK certificates of the AR and the AC and check platform trustworthiness of the AR and the AC;

the AR is connected with the AC through a protocol interface via network, the AC is connected with the PM through a protocol interface via network, and the AR is connected with the PM through the AC via network;

the protocol interface connecting the AR with the AC comprises: a trusted network transport interface IF-TNT and an interface IF-TNACCS between a TNAC client and a TNAC sever; the IF-TNT is an information exchanging interface between a network access requestor NAR and a network access controller NAC on a network access control layer, and the IF-TNACCS is an information exchanging interface between the TNAC client and the TNAC server on the trusted platform evaluation layer;

the protocol interface between the AC and the PM comprises: an authentication policy service interface IF-APS, an evaluation policy service interface IF-EPS and a trustworthiness measurement interface IF-TM; the IF-APS is an information exchanging interface between a network access controller NAC and an authentication policy server APS on the network control layer, and the IF-EPS is an information exchanging interface between a TNC server and an evaluation policy server EPS on the trusted platform evaluation layer; and the IF-TM is an interface between a trustworthiness measurement collector and a trustworthiness measurement verifier on the trustworthiness measurement layer; and the protocol interface connecting the AR with the PM comprises a trustworthiness measurement interface IF-TM, and the IF-TM is an interface between the trustworthiness measurement collector and the trustworthiness measurement verifier on the trustworthiness measurement layer, wherein the AR includes a client station, wherein the AC includes a base station.

2. The trusted network access control system based on the tri-element peer authentication according to claim 1, characterized in that the AR comprises a network access requestor NAR, a TNAC client TNACC and the trustworthiness measurement collector $TMC_1$ of the access requestor, the NAR is connected with the TNACC in a data carrying manner, and the TNAC client TNACC is connected with the $TMC_1$ of the AR through a trustworthiness measurement collector interface IF-TMC, wherein:

the AC comprises a NAC, a TNAC server TNACS and the trustworthiness measurement collector $TMC_2$ of the AC, the NAC is connected with the TNACS in a data carrying manner, and the TNAC server TNACS is connected with the $TMC_2$ of the AC through the IF-TMC;

the PM comprises an APS, an EPS and a trustworthiness measurement verifier TMV, the APS is connected with the EPS in a data carrying manner, and the EPS is connected with the TMV through the trustworthiness measurement verifier interface IF-TMV;

the NAR is connected with the NAC through a trusted network transport interface IF-TNT, and the NAC is connected with the APS through the IF-APS;

the TNACC is connected with the TNACS through an interface IF-TNACCS between the TNAC client and the TNAC server, and the TNACS is connected with the EPS through the IF-EPS; and the $TMC_1$ of the AR is connected with the TMV through the IF-TM, and the $TMC_2$ of the AC is connected with the TMV through the IF-TM.

3. The trusted network access control system based on the tri-element peer authentication according to claim 1, characterized in that the AR and the AC are logical entities with a trusted platform module TPM.

4. The trusted network access control system based on the tri-element peer authentication according to claim 2, characterized in that the AR and the AC are logical entities with a trusted platform module TPM.

* * * * *